United States Patent [19]

Pham et al.

[11] Patent Number: 5,524,253
[45] Date of Patent: Jun. 4, 1996

[54] SYSTEM FOR INTEGRATING PROCESSING BY APPLICATION PROGRAMS IN HOMOGENEOUS AND HETEROGENEOUS NETWORK ENVIRONMENTS

[75] Inventors: Thong Pham, Cupertino; Scott Gulland; Mitch Amino, both of San Jose, all of Calif.; Mari Budnick, Beaverton, Oreg.; Daryl Gaumer, San Jose, Calif.; Cynthia Givens, Santa Clara, Calif.; Mark Ikemoto, Milpitas, Calif.; Sharat Israni, Menlo Park, Calif.; Clemen Jue, Los Altos Hills, Calif.; Alan Miranda, San Jose, Calif.

[73] Assignee: Hewlett-Packard Company, Palo Alto, Calif.

[21] Appl. No.: 107,044

[22] Filed: Aug. 13, 1993

Related U.S. Application Data

[63] Continuation of Ser. No. 521,543, May 10, 1990, abandoned.

[51] Int. Cl.⁶ .......................... G06F 9/455; G06F 13/40; G06F 9/24
[52] U.S. Cl. .......................... 395/800; 364/228; 364/229.4; 364/229.5; 364/230.5; 364/256.4; 364/256.5; 364/284.4; 364/DIG. 1; 364/DIG. 2; 395/500
[58] Field of Search ........................ 395/200, 325, 395/800, 575, 500, 250, 275, 200.16, 23, 200.02, 650, 600, 200.01, 200.1, 182.09, 163, 200.18; 364/DIG. 1, DIG. 2, 132; 340/825.31, 825.34, 825.44

[56] References Cited

U.S. PATENT DOCUMENTS

| | | | |
|---|---|---|---|
| 4,729,094 | 3/1988 | Zolnowsky et al. | 395/200 |
| 4,956,800 | 9/1990 | Kametani | 395/800 |
| 5,065,312 | 11/1991 | Brudere et al. | 395/575 |
| 5,097,533 | 3/1992 | Burger et al. | 395/500 |
| 5,113,516 | 5/1992 | Johnson | 395/500 |
| 5,119,465 | 6/1992 | Jack et al. | 395/500 |
| 5,124,909 | 6/1992 | Blakely et al. | 395/200 |
| 5,129,077 | 7/1992 | Hillis | 395/500 |

FOREIGN PATENT DOCUMENTS 304071  8/1988  European Pat. Off. .

OTHER PUBLICATIONS

Computer Communications, vol. 13, No. 1, Jan. 1990, London, GB pp. 4–16 H. Lorin 'Application Development, Software Engineering And Distributed Processing'.

H. Johnson, "Each Piece in its Place", *Unix Review,* Jun. 1987, pp. 66–75.

*Primary Examiner*—Daniel Pan

[57] ABSTRACT

System Configuration files in source code are created from a high level definition of the distributed system which is to be integrated. The configuration files include data such as the types and formats of data for each process on each node of the system, identification of all applications and machine types, topography and the data manipulations needed for sending messages and files and the like from an application program in a first computer language and of a first data type to an application program in a second computer language and of a second data type. Node-specific data manipulation modules are formed at each node during start-up of the system, and these modules are automatically distributed to nodes on the network having the same architecture. The invention allows applications having different physical data characteristics to communicate by using the data manipulation modules so formed to manipulate the data at the source program into a common data representation (CDR) having data types common to all of the languages represented by the system and then reconverting the data to the local representation at the destination node.

3 Claims, 9 Drawing Sheets

SYSTEM FOR INTEGRATING PROCESSING BY APPLICATION PROGRAMS IN HOMOGENEOUS AND HETEROGENEOUS NETWORK ENVIRONMENTS

CROSS REFERENCE TO RELATED APPLICATION(S)

This is a continuation of patent application Ser. No. 07/521,543 filed on May 10, 1990, now abandoned.

BACKGROUND OF THE INVENTION

1. Field of the Invention

The present invention relates to a system for integrating existing application programs in a networked environment, and more particularly, to a system with mechanisms for transforming and manipulating data messages for transfer between different applications on the same computer or on different computers connected via a network or networks and having the same or different computer architectures.

2. Description of the Prior Art

Since the beginning of the computer age, computers and, in particular, computer software programs have been used in a variety of settings to automate processes which were previously conducted mechanically. This automation has typically led to improved efficiency and increased productivity. However, because of the costs of such automation, automation of large businesses and factories has often been conducted on a piecemeal basis. For example, different portions of an assembly line have been automated at different times and often with different computer equipment as a result of the varying functionalities of the various computer systems available at the time of purchase. As a result, many assembly lines and businesses have developed "islands of automation" in which different functions in the overall process are automated but do not necessarily communicate with one another. In addition, in the office environment LANs have been used to allow new computer equipment to communicate; however, software applications typically may not be integrated because of data incompatibilities.

Such heterogeneous systems pose a significant problem to the further efficiencies of automation since these different "islands of automation" and machines with incompatible data types connected to the same network cannot communicate with one another very easily. As a result, it has been difficult and expensive to control an entire assembly line process for a large manufacturing facility from a central location except on a piecemeal basis unless the entire factory was automated at the same time with homogeneous equipment which can intercommunicate. Thus, for those businesses and factories which have already been automated on a piecemeal basis, they are faced with the choices of eliminating all equipment so that homogeneous equipment may be substituted therefor (with the associated prohibitive costs) or waiting for the existing system to become obsolete so that it can be replaced (again at significant expense).

One solution to the above problem has been to hire software programmers to prepare custom code which allows the different "islands of automation" to communicate with each other. However, such an approach is also quite expensive and is rather inflexible and assumes that the overall system remains static. In other words, when further equipment and application software must be integrated into the overall system, the software programmers must be called back in to rewrite the code for all applications involved and to prepare additional custom code for interface purposes. A more flexible and less expensive solution is needed.

The integration of existing heterogeneous applications is a problem which has yet to be adequately solved. There are numerous major problems in such integration of existing applications because of the differences in hardware and their associated operating systems and because of the differences in the applications themselves. For example, because computers are built on proprietary hardware architectures and operating systems, data from applications running on one system is often not usable on another system. Also, programmers must frequently change application code to create interfaces to different sets of network services because of the diversity of such network services. In addition, different applications use different data types according to their specific needs, and, as a result, programmers must alter a receiving application's code to convert the data from another application into types that the receiving application can use. Moreover, incompatible data structures often result because of the different groupings of data elements by the applications. For example, an element with a common logical definition in two applications may still be stored in two different physical ways (i.e., application A may store it in one two-dimensional array and application B may store it in two one-dimensional arrays). Moreover, applications written in different languages usually cannot communicate with one another since data values are often interpreted differently. For example, C and FORTRAN interpret logical or boolean values differently.

Partial solutions to the above problems have been proposed to provide distributed networks for allowing various applications to share data. In doing so, these applications have relied on transparent data sharing mechanisms such as Sun Microsystems' Network File System (NFS), AT&T's Remote File Sharing (RFS), FTAM (as defined by the MAP/TOP specifications), or Apollo's Domain File System. However, these systems are limited in that they allow data sharing but do not allow true integration of the different application programs to be accomplished.

Another example of a system for providing interprocess communication between different computer processes connected over a distributed network is the Process Activation and Message Support (PAMS) system from Digital Equipment Corp. This system generally allows processes to communicate with each other regardless of where the processes reside on a common network. Such processes may be located on a single CPU or spread across workstations, clusters, or local or wide area networks (LANs or WANs). The PAMs system manages all connections over the network and provides integration features so that processes on respective workstations, clusters and the like may communicate. In particular, the PAMs message processing system is a network layer which is implemented above other networks to transparently integrate new networks and events into a common message bus. Such a system enables network configuration to be monitored and message flow on the message bus to be monitored from a single point. The result is a common programming interface for all host environments to which the computer system is connected. Thus, all host environments appear the same to the user.

For example, an ULTRIX host environment running ULTRIXPAMS is directly connected to a VMS host running VAX-PAMS on its networks, and ULTRIX-PAMS uses VAX transport processes to route all messages over the network. Specific rules are then provided for routing messages using ULTRIX-PAMS and VAX transport processes, where the ULTRIX-PAMS functions as a slave transport in that it can only communicate to other PAMS processes via the network to a full function PAMS router. As a result, the PAMS system is limited in that there is no support for "direct" task-to-task communications between ULTRIX processes. In addition, since all traffic must be routed through a VAX-PAMS routing node, a single point of failure exists for the system.

Other systems have been proposed for an information processing environment in which various machines behave as one single integrated information system. However, to date such systems are limited to connecting various subroutines of homogeneous applications running on different machines connected to a common network. For example, the Network Computing System (NCS) of Apollo is a Remote Procedure Call (RPC) software package which allows a process (user application) to make procedure calls to the services exported by a remote server process. However, such RPC systems are typically not fit for the development of a networked transaction management system, for NCS does not provide a message and file handling system, a data manipulation system, a local and remote process control system and the like which allows for the integration of existing applications. Rather, NCS allows for the building of new distributed applications, and does not provide for the integration of existing heterogeneous applications. RPCs instead isolate the user from networking details and machine architectures while allowing the application developer to define structured interfaces to services provided across the existing network.

RPCs can be used at different levels, for the RPC model does not dictate how they should be used. Generally, a developer can select subroutines of a single application and run them on remote machines without changing the application or subroutine code. The simplest use of RPCs is to provide intrinsic access to distributed resources which are directly callable by an application, such as printers, plotters, tape drives for backup tasks, math processors for complex and time-consuming applications, and the like. A more efficient use of RPC at the application level would be to partition the application so that the software modules are co-located with the resources that they use. For example, an application which needs to extract data from a database could be partitioned so that the modules which access the database could reside on the database machine.

A diagram of NCS is shown in FIG. 1. The system 100 therein shown generally consists of three components: an RPC run time environment 132,134 which handles packaging, transmission and reception of data and error correction between the user and server processes; a Network Interface Definition Compiler (NIDC) 136 which compiles high-level Network Interface Definition Language (NIDL) into a C-language code that runs on both sides of the connection (the user and server computers); and a Location Broker 128 which lets applications determine at run time which remote computers on the network can provide the required services to the user computer. In particular, as shown in FIG. 1, a user application 102 interfaces with a procedure call translator stub 104 which masquerades as the desired subroutine on the remote computer. During operation, the RPC run time system 106 of the user's computer and the RPC run time system 108 of the server system communicate with each other over a standard network to allow the remote procedure call. Stub 110 on the server side, which masquerades as the application for the remote subroutine 112, then connects the remote subroutine 112 across the network to the user's system.

The NCS system functions by allowing a programmer to use a subroutine call to define the number and type of data to be used and returned by the remote subroutine. More particularly, NCS allows the application developer to provide an interface definition 114 with a language called the Network Interface Definition Language (NIDL) which is then passed through NIDL compiler 116 to automatically generate C source code for both the user and server stubs. In other words, the NIDL compiler 116 generates stub source code 118 and 120 which is then compiled with RPC run time source code 122 by C compilers 124 and 126 and linked with the application 102 and user-side stub 104 to run on the user's machine while the subroutine 112 and its server-side stub 110 are compiled and linked on the server machine. After the application 102 has been written and distributed throughout the network, location broker 128 containing network information 130 may then be used to allow the user to ask whether the required services (RPC) are available on the server system.

Thus, with NCS, the NIDL compiler automatically generates the stubs that create and interpret data passed between an application and remote subroutines. As a result, the remote subroutine call appears as nothing more than a local subroutine call that just happens to execute on a remote host, and no protocol manipulations need to be performed by the application developer. In other words, the NCS system is primarily a remote execution service and does not need to manipulate data for transfer by restructuring a message to allow for conversion from one data type to another. A more detailed description of the NCS system can be found in the article by H. Johnson entitled "Each Piece In Its Place," *Unix Review*, June 1987, pages 66–75.

The RPC system of the NCS primarily provides a remote execution service which operates synchronously in a client/server relationship in which the client and server have agreed in advance on what the requests and replies will be. Applications must be developed specifically to run on NCS or substantially recoded to run on NCS. Moreover, because a remote procedure cannot tell when it will be invoked again, it always initiates communications at the beginning of its execution and terminates communications at the end. The initiation and termination at every invocation makes it very costly in performance for a remote procedure to set up a connection with its caller. As a result, most RPC systems are connectionless. This is why RPC systems such as NCS must build another protocol on top of the existing protocol to ensure reliability. This overhead causes additional processing to be performed which detracts from performance.

Accordingly, although NCS provides a consistent method for remote execution in a heterogeneous network environment, it is designed primarily to broker distributable services such as printing and plotting across the network, where the user may not care which printer prints the information as long as it gets printed. Another type of service might be providing processing time for applications where a small amount of data in a message can trigger an intensive and time consuming calculation effort to achieve an answer that can itself be turned into a message. However, the NCS system cannot provide a truly integrated system for incompatible node type formats and data processing languages.

None of the known prior art systems address the substantial problems of integrating existing heterogeneous applications in a heterogeneous and/or homogeneous network environment. Accordingly, there is a long-felt need in the art for an integration system which provides for flexible data transfer and transformation and manipulation of data among existing applications programmed in a networked environment of heterogeneous and/or homogeneous computers in a manner that is transparent to the user. The present invention has been designed to meet these needs.

SUMMARY OF THE INVENTION

The inventors of the subject matter disclosed and claimed herein have satisfied the above-mentioned long-felt needs in the art by developing a software tool which enables a system integrator or end-user flexibly and efficiently to produce run time software for integration of existing applications in a networked environment of heterogeneous computers. In order to achieve this goal, the present invention provides functionality equivalent to that of a combination of a message and file handling system, a data manipulation system, and a local and remote program control system. From the system integrator's viewpoint, the present invention provides a message handling system which allows data types and data formats to be different at each end of the messaging system, while any changes in data elements, data types or data formats of the messages will only require a reconfiguration of the system before start-up. Since reconfiguration is an administrative level activity, the user will not be required to change his or her source code in the communicating applications.

Accordingly, the present invention is specialized for easy modification of data types and data formats passed so as to allow transparent communication between data processes of different formats on machines of different types. As a result, the application programs which are communicating need not be written in the same language or be downloaded onto the same computer type. The present invention further allows users to link existing applications with minimal or no changes to the code of the applications, thereby reducing the amount of custom code that needs to be written, maintained and supported for integrating existing systems.

The present invention addresses the major integration problems noted in the background portion of this specification by providing for local and remote inter-application data transfer whereby existing applications may be linked with minimal or no modifications to the applications. Synchronous and asynchronous memory-based message transfers and file transfers between applications are also supported. In addition, language, data format and data type differences are resolved utilizing data manipulation features such as rearranging, adding or deleting fields and converting between data types in accordance with differences in hardware, language alignment, and data size. This is accomplished in a preferred embodiment by using a Common Data Representation (CDR) for the messages to be transferred between heterogenous nodes.

The data manipulator (DMM) of the invention provides automatic manipulation of data during run time so that two communicating processes can use each other's data without having to change their own data models. The data manipulator of the invention takes care of hardware discrepancies, application dependencies and computer language semantic differences. It can convert one data type to another, restructure a message format and assign values to data items.

Typically, conversion routines are only good for the two machine architectures and/or two languages involved. With the addition of any new language or machine architecture to this networked system, a new set of routines must be created on all previous machine architectures in the network to support the transfer of the data to applications on the new machine or to applications written in the new language. The present invention has been designed to minimize the alteration or addition of routines that were written on older machine architectures in the network when new machines or languages are added to the system. Also, by making the data manipulation module node-specific, it is also possible in accordance with the invention to cut down on the number of sets of routines a particular machine might need to send/receive data to/from other machines.

BRIEF DESCRIPTION OF THE DRAWINGS

The objects and advantages of the invention will become more apparent and more readily appreciated from the following detailed description of presently preferred exemplary embodiments of the invention taken in conjunction with the accompanying drawings of which.

FIG. schematically illustrates a prior art Network Computing System (NCS) which allows applications running in a distributed environment to share computations as well as data.

DETAILED DESCRIPTION OF THE PRESENTLY PREFERRED EMBODIMENT

Figure 1:
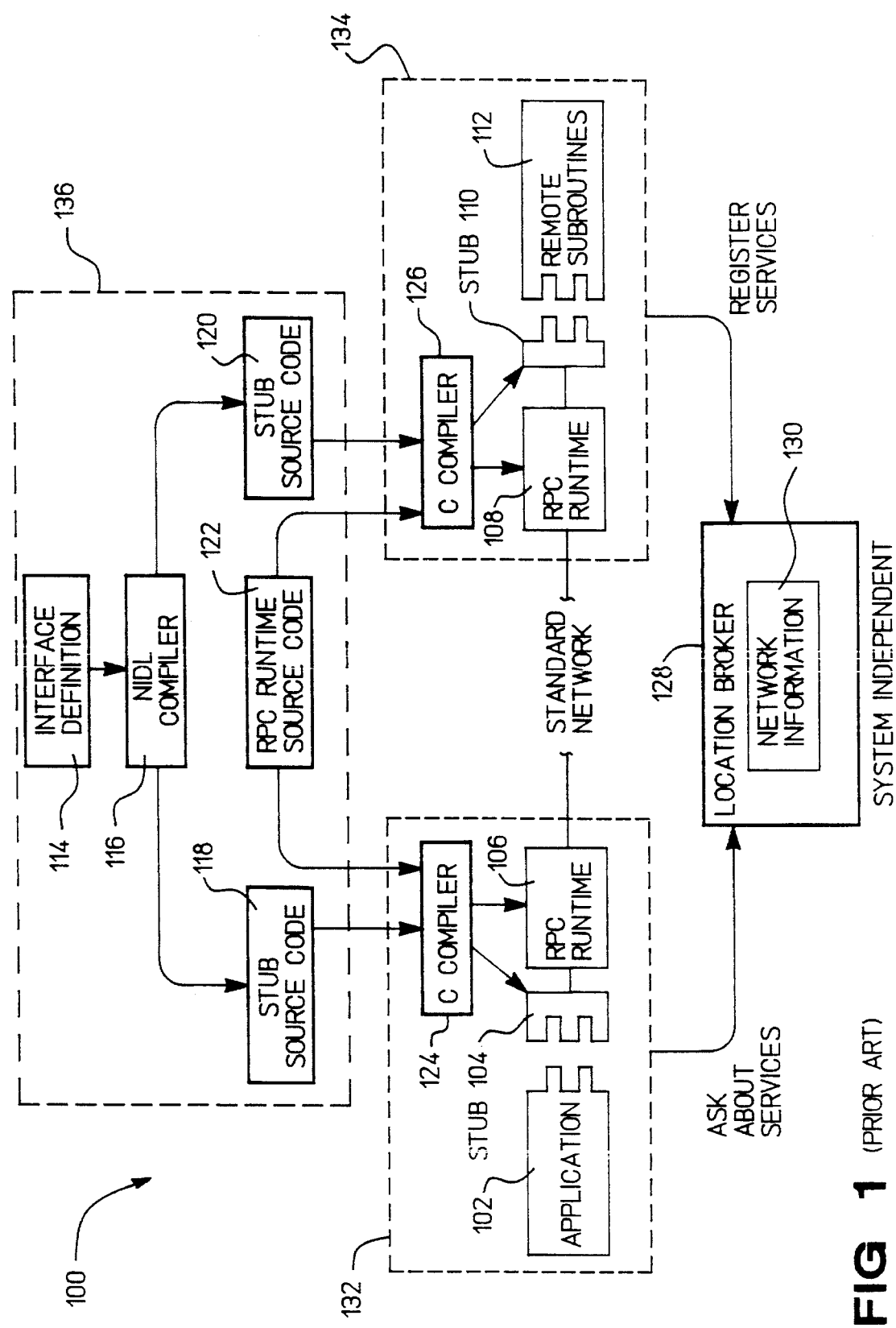

A system with the above-mentioned beneficial features in accordance with a presently preferred exemplary embodiment of the invention will be described below with reference to FIGS. 2–9. It will be appreciated by those of ordinary skill in the art that the description given herein with respect to those figures is for exemplary purposes only and is not intended in any way to limit the scope of the invention. All questions regarding the scope of the invention may be resolved by referring to the appended claims.

As noted above, present day manufacturing computer systems have often been built from the bottom up, thereby resulting in the creation of isolated "islands of automation." For example, the areas of design and engineering, manufacturing resource planning, and manufacturing have typically been independently automated. As a result, these islands of automation consist of heterogeneous computer systems, operating systems, and data base systems. However, manufacturers are now looking for higher levels of efficiency and productivity than is available in such prior art systems. Computer Integrated Manufacturing (CIM), the integration of these islands of automation, is a means of achieving such higher levels of efficiency and productivity. The preferred embodiment of the present invention is designed for facilitating the development of CIM solutions. As will be clear from the following, this is accomplished by integrating existing application programs in a networked environment of heterogeneous computers by providing flexible data transfer, transformation and manipulation mechanisms.

Generally, the present invention produces run time code that comprises several active programs (or software modules) which are used at run time to provide communication between applications on the same or different nodes, where a node is any computer in the network's domain. The applications can be on different computer systems or on the same computer and may be in the same or different computer languages. These run time programs handle the data transfer from the source application program to the destination application program by transforming the data from the source program into an architectural and language independent format using a CDR. For example, the field and record data in the source machine's format is converted to the destination machine's format by first converting to a CDR using locally stored routines which convert the internal representation of data on the source machine to the common data representation format, and after the transfer of the CDR data, the CDR data is converted to the internal representation for data on the destination machine using locally stored routines. In particular, predefined links of sources and destinations are called by software modules of the invention to make certain that the information is correctly routed from the source to the destination machine. This latter information is called the configuration data and corresponds to information provided by the system's integrator concerning the nodes, processes and possible data manipulations to be performed on the network.

The system of the invention generally consists of run time and non-run time components. The run time components of the invention will be described in more detail with respect to FIGS. 2–4, while the non-run time components will be described in more detail below with respect to FIGS. 5 and 6.

Figure 2:
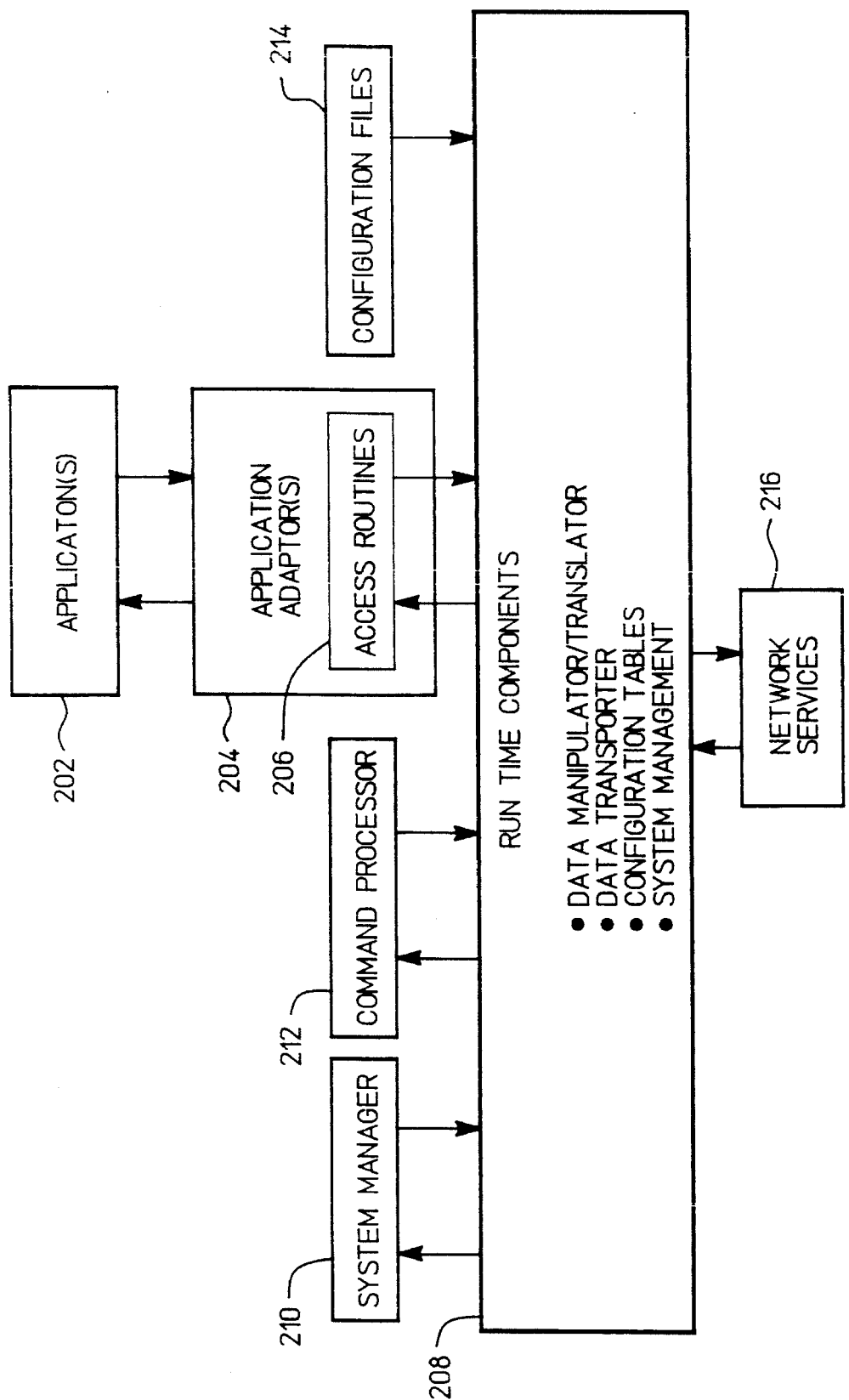
FIG. 2 schematically illustrates the basic components of the integration system in accordance with the invention.

As shown in FIG. 2, the run time components 208 include a data manipulator/translator, a data transporter, configuration tables and a system manager. As will be described in more detail below, the data manipulator/translator functions to transform data to and from a CDR format acceptable to a given process of a specified host computer, while the data transporter functions to pass data in the common data representation to/from the network system for sending to a destination application. However, as will be noted below, the data transporter also functions to send unmanipulated data to the destination application when the source and destination applications have the same type and format and hence the message data does not need to be manipulated.

Thus, as shown in FIG. 2, in the system of the invention a plurality of user application programs 202 are connected via application adaptors 204 using access routines 206 so as to communicate with the run time components 208 of the invention. The application adaptors 204 comprise user-written programs which act as software bridges between the user's application and the system of the invention. In particular, these user-written application adaptor programs call access routines from an access routine library 206 in order to send messages, copy files, control processes, and the like on the network of the invention. These access routines 206 are thus used to provide the user with the necessary commands for preparing the application adaptor programs. Sample access routines are provided below as an Appendix A hereto, and sample adaptors are attached as an Appendix B hereto.

System manager 210 enables a user to administer operation of the system during run time operation. For example, the system manager 210 allows the user to access the software of the invention to validate configuration, start-up and shut-down the system and perform other system management functions. The command processor 212, on the other hand, corresponds to a module accessed through the system manager 210 so as to allow a user to interactively test the messages and links to any process or node within the domain of the invention. (As used herein "domain" means the collection of computers that are configured to work together in accordance with the invention.) In addition, configuration files 214 contain information about the nodes, the structure of the data produced and consumed by the processes, the manipulations that must be performed on data produced by an application so that it is acceptable by different processes, and the links binding manipulations to specific languages. Such information is provided by the systems integrator before run time and will be discussed in more detail below. The run time components are loaded into each node at start-up time using the system manager 210, and these components manipulate messages (as necessary) and transport them using the data transporter. The manipulations are performed in accordance with data in configuration files 214 held in memory at each node. Finally, the data transporter communicates with the network services 216 to pass the message to the destination node.

Figure 3:
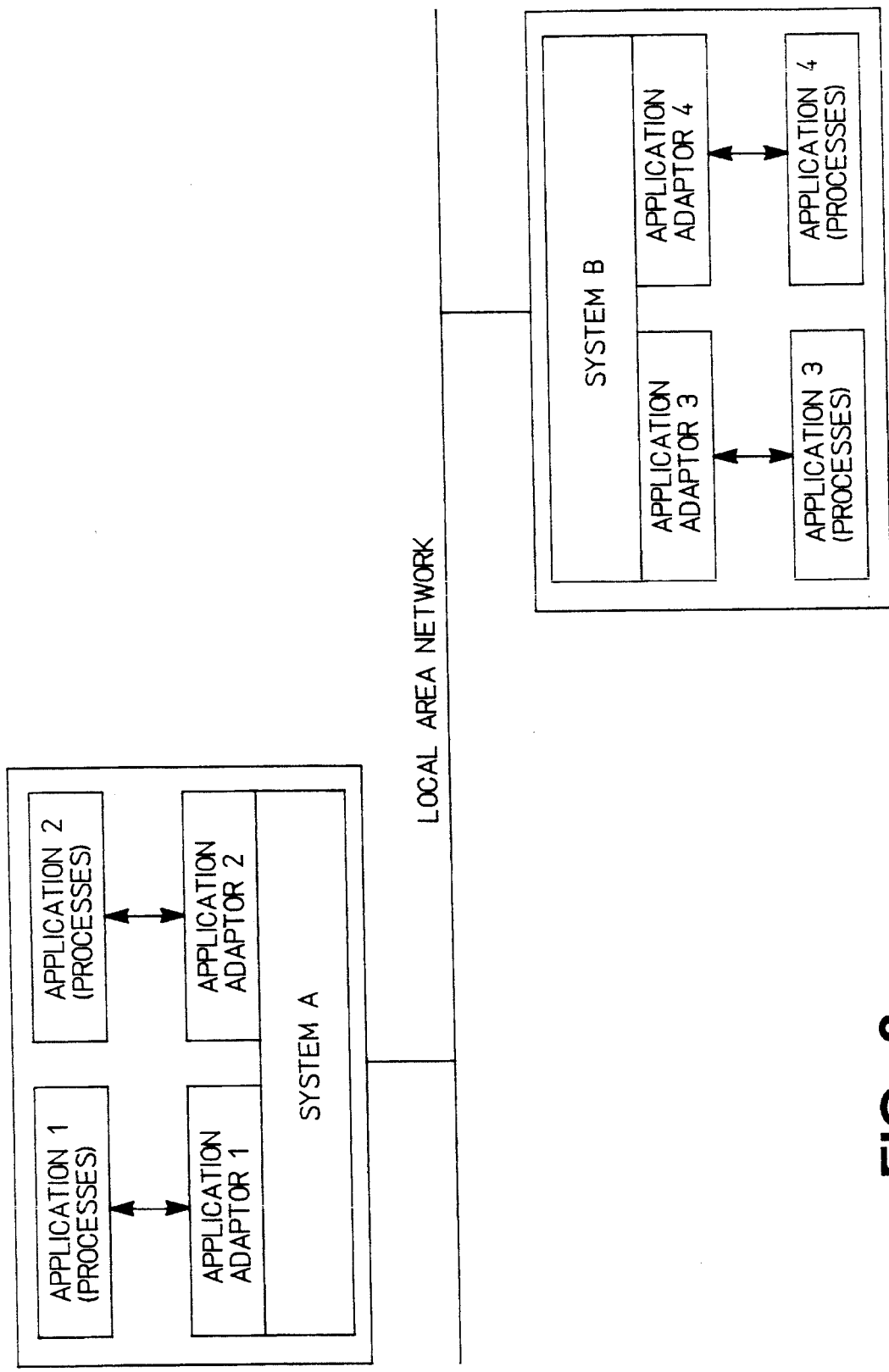
FIG. 3 schematically illustrates how the invention can be used to connect an application to others on the same system or to applications that reside on one or more remote systems.

FIG. 3 shows a system in accordance with the invention where two nodes on a LAN have run time integration systems A and B in accordance with the invention for integrating applications 14. As shown, each node is loaded with the run time system of the invention (including all elements shown in FIG. 2) for allowing the processes 1–4 to communicate even if they have different data types and language formats. In FIG. 3, there are various possibilities for communication between the processes shown. For example, Application 1 may communicate with Application 2 through the integration System A. Application 1 may generate data meant for Application 2 in the shared memory of the host computer or in the form of files resident on the host disk. This data is picked up by Application Adaptor 1 and passed to Integration System A, which then gives it to Application Adaptor 2 for passing on to Application 2. Integration System A optionally can be instructed to manipulate the data before sending it to Application 2. The data manipulation can consist of literal assignments to data, moving data from one structure to another, and translating data from one structure to another.

On the other hand, the data may be picked up by Application Adaptor 1 and given to Integration System A. This data is then sent across the LAN to Integration System B. Application Adaptor 3 is given the data by Integration System B which then passes it Application 3 for its use. The user can decide whether any necessary data manipulations are done by Integration System A or Integration System B.

Figure 4:
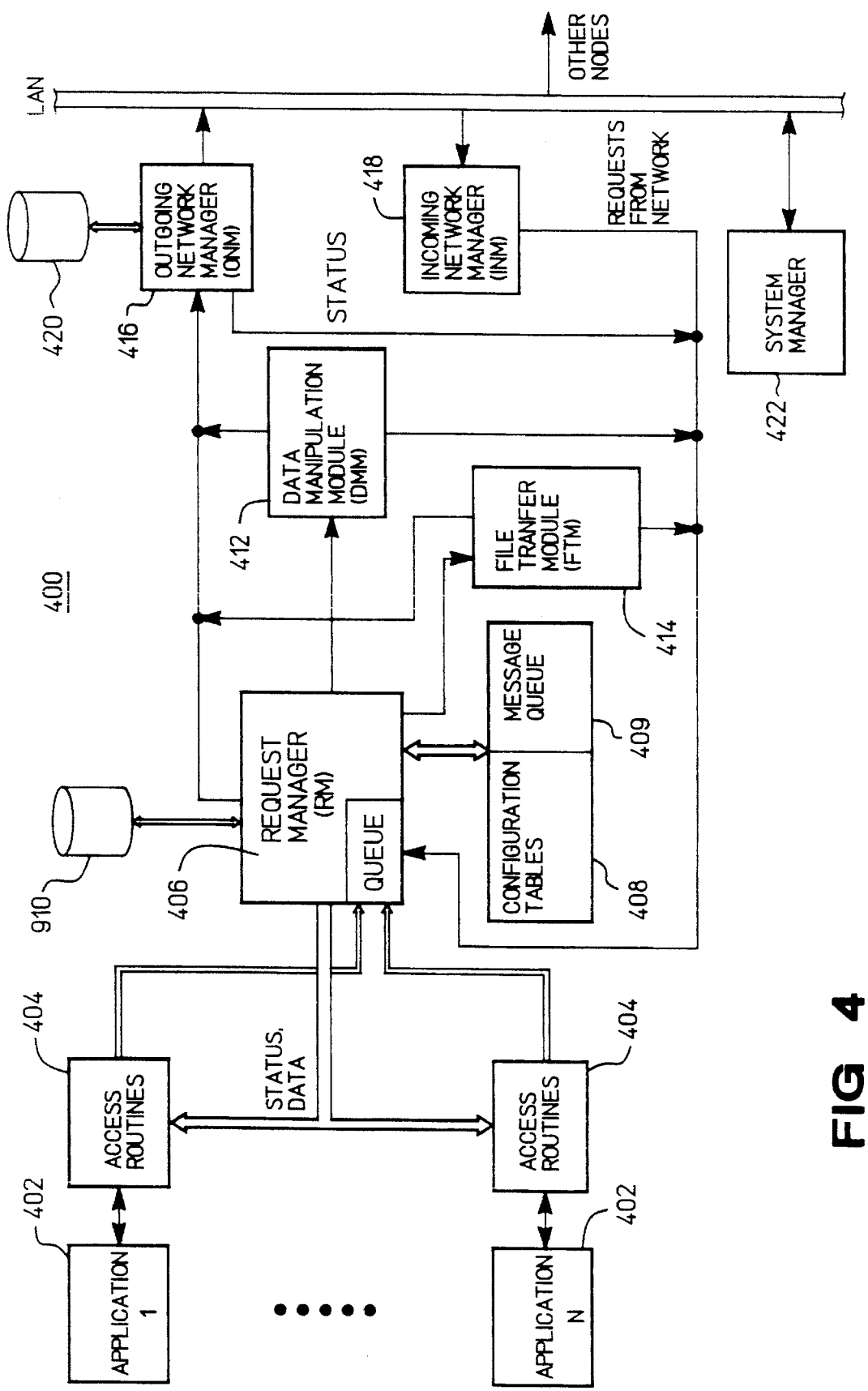
FIG. 4 schematically illustrates the configuration of the run time components of the integration system in accordance with the invention.

FIG. 4 shows an implementation of the present invention on a given node 400 of a heterogeneous network system during run time. As shown, the integration system of the invention integrates all of the user's application programs (processes) 402 which run on the node 400. Applications running on other nodes (not shown) are similarly integrated. As noted above with respect to FIG. 2, these application programs 402 are respectively given access to the integration system of the invention via access routines 404, which communicate with the integration system of the invention via a library of access routines such as those in Appendix A.

The request manager (RM) 406 maintains a single queue for all user's application program requests so that one entry per defined process on node 400 may be read at a given time.

The request manager 406 reads the request from the application program 402 and performs the requested action. Requests can be of the following types: reading a message, sending a message, sending a file, starting another process, stopping another process, clearing the RM message queue area, recording an error on spooling device 410, setting the options for data transfer, deleting a particular message and the like, as apparent from the sample access routines in Appendix A. For example, a user's application program 402 may call an access routine to send a message to an application program on another node to indicate that a value monitored by the application program 402 has changed state. The request manager 406 will then check its configuration tables 408 and the request from the application adaptor to see if a data manipulation was requested and is necessary for the sending of the message to the remote node. As will be described below with respect to FIG. 5, the configuration tables 408 will contain information about all nodes, processes and data manipulations possible for all message transfers within the network. Accordingly, by determining the source process and the destination process of the message request as well as the respective nodes and whether the message requested specified a link logical name, the request manager 406 can determine whether the data needs to be manipulated for the transfer. The request manager 406 also maintains a message queue (memory area) 409 which contains linked lists of data messages for incoming data from other processes. In addition, request manager 406 may log user messages to disc 410, if requested, by the sending process. Information such as error messages and the like also may be stored for use during system diagnostics.

When request manager 406 determines that an indicated message needs to be manipulated (i.e., the source message needs to be converted to a different format and/or different language), the request is passed to data manipulation module (DMM) 412 where the message is converted to a common data representation (CDR) as will be described below before being sent to the destination node. If the message from the application program 402 calls for a transfer of a data file, the indicated file is transferred by File Transfer Module (FTM) 414 to the destination node. A file message containing file information is sent to ONM 416 after a successful file transfer. If the request manager 406 determines that the application program is to send a message to a destination process without manipulation, no manipulation is performed. The message data is thus sent directly to Outgoing Network Manager (ONM) 416. ONM 416 receives the unmanipulated message from request manager 406, a message from the File Transfer Module 414 indicating that a file has been transferred or the message converted to its common data representation by data manipulation module 412 and outputs the message onto the LAN by making a network service call to send the message to the destination node. Messages that are specified as "critical" by the sending process and which cannot be successfully sent over the network to the destination node are stored (spooled) by ONM 416 to disc file 420. Failure to send a message can occur for several reasons including a node or network failure or a system shutdown. ONM re-attempts to send a message previously spooled to disc 420 when the original cause of the failure to send the message has been corrected.

If the sending process specifies that a message is to be sent "with-wait" then ONM 416 sends status information to request manager 406's input queue when the message could not be sent to the destination node. However, if a message does not have to be manipulated and the destination process resides on the same node, then the message is not sent via ONM 416. Instead, the message is placed directly into the destination process' message area queue, preventing unnecessary data transmission. If the sending process specifies that a message is to be sent with "guaranteed delivery", then the request manager 406 will save those received messages in disc file 410 and will delete such messages only if there is a deletion request from an application program 402. A read request is typically done by a receiving process before a deletion request is done. If a message is not to be sent with guaranteed delivery, then request manager 406 saves the message in its memory area 409 and the message is available to the receiving process via a read message request. When the receiving process does a read request, it can specify whether the message is to be deleted or not.

Incoming network manager (INM) 418 receives incoming messages from the network and determines whether these messages need to be converted to local format from the common data representation format before being sent to the destination application program 402. If such a translation is necessary, as when the source node was of a different data type or the source programming language was different, the message is converted from the common data representation to the local data representation using a library of conversion (unmarshalling) routines before the message is sent to the input queue of request manager 406. Incoming messages which do not require such manipulation are sent directly to the input queue of the request manager 406.

Finally, as noted above with respect to FIG. 2, a system manager 422 is also preferably provided to allow the user to administer the system management functions of the integration system of the invention during run time. Preferably, a particular node is selected for this purpose.

The manipulations must take place when an application A having a first language A and data fields of a first type is to communicate during run time with an application B having a second language B and data fields of a second type. In accordance with the manipulation technique of the invention, a Data Definition Language (DDL) is used to define the data fields of the application program A and the application program B. The data fields of the DDL are then manipulated (rearranged) or the data types are converted by a Data Manipulation Language (DML) to that of a Common Data Representation (CDR) having a universal encoding scheme such as Abstract Syntax Notation One's (ASN.1) Basic Encoding Rules (BER). The manipulated data is then converted at the destination node into language B with associated data fields for application B. DDL and DML will now be described in more detail.

The aforementioned Data Definition Language (DDL) is a high level language used in accordance with the invention to define the logical structure and types of data used by all application programs on the network. More particularly, DDL is used to define data types with declarations in the Data Definition configuration file (Ddef) as will be described in more detail below with respect to FIG. 5. Traditional languages such as C, FORTRAN, and PASCAL are directly tied to the machine architecture in which they are implemented. This is because while different languages may have identical logical data types, those data types may be physically represented differently. For example, both C and FORTRAN have multi-dimensional array types; however, to store this data type, C uses row-major ordering while FORTRAN uses column-major ordering. DDL provides a full set of predefined data types that lets the system integrator describe the logical layout of the data used in application programs. In addition to the basic data types in most languages, DDL may include an additional data type called "opaque" in accordance with the invention, where "opaque" is a custom data type used to describe "type-less" data.

Data in DDL is defined in a manner roughly equivalent to the type definition in C or the type declaration in Pascal. DDL declarations in accordance with the invention are similar to the data declarations sections of standard languages such as C and PASCAL and hence are believed to be well within the level of skill of one of ordinary skill in the art. For example, the DDL of the invention preferably includes information about the data types of all the procedures, and unlike the prior art, the DDL of the present invention allows for conversion from one data type to another in accordance with the DML described in more detail below. Moreover, unlike traditional languages, a DDL definition in accordance with the invention does not bind any particular language or machine representation to the data definition. Rather, data definitions and machines are linked through a linkage definition as will be described below. Thus, the DDL in accordance with the invention is primarily concerned with the logical layout of data, and accordingly, a suitable DDL which supports the languages on the network to be integrated is believed to be well within the skill of one of ordinary skill in the art. By way of example, a partial description of a possible DDL supporting C, FORTRAN and Pascal on a network is described in Appendix C. Appendix C also includes BNF syntax diagrams for DDL declarations in such a case.

Data Manipulation Language (DML) as used herein is a high-level language that is used to manipulate data. After the data types are defined in DDL (in Ddef), the manipulations that must be performed on that data are defined in the Data manipulation definition configuration file (Dman) using DML as will be described below with respect to FIG. 5. The data manipulation declarations can be either assignment statements or move statements. Assignment statements set default values for destination structures, while move statements move the source data structure to the destination data structure, correcting for differences in languages and machine architectures, and providing type conversions where necessary. These type conversions may be performed on boolean, integer, floating point and ASCII fields.

As an example of a DML in accordance with the invention, a DML is described in Appendix D for a network have a DDL supporting C, FORTRAN and Pascal. Appendix D also includes BNF Syntax diagrams for DML definitions in such a case. One skilled in the art will appreciate that the DML described in Appendix D is for a specific embodiment and may be readily modified by one skilled in the art in accordance with the general principles set forth herein.

SETUP PROCEDURES

Figure 5:
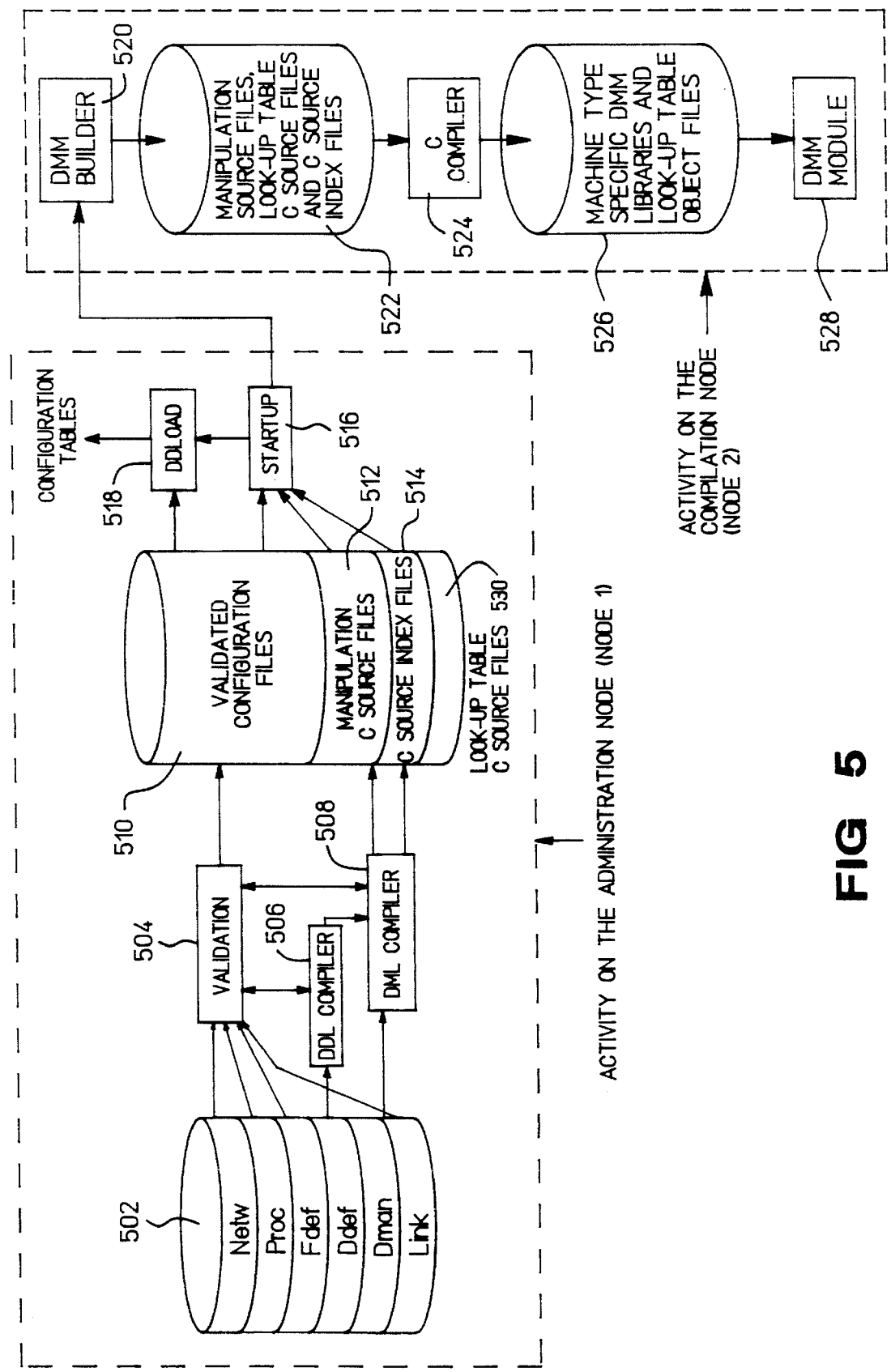
FIG. 5 schematically illustrates the creation of a Data Manipulation Module (DMM) of the invention through start-up by the start-up node.
Figure 6:
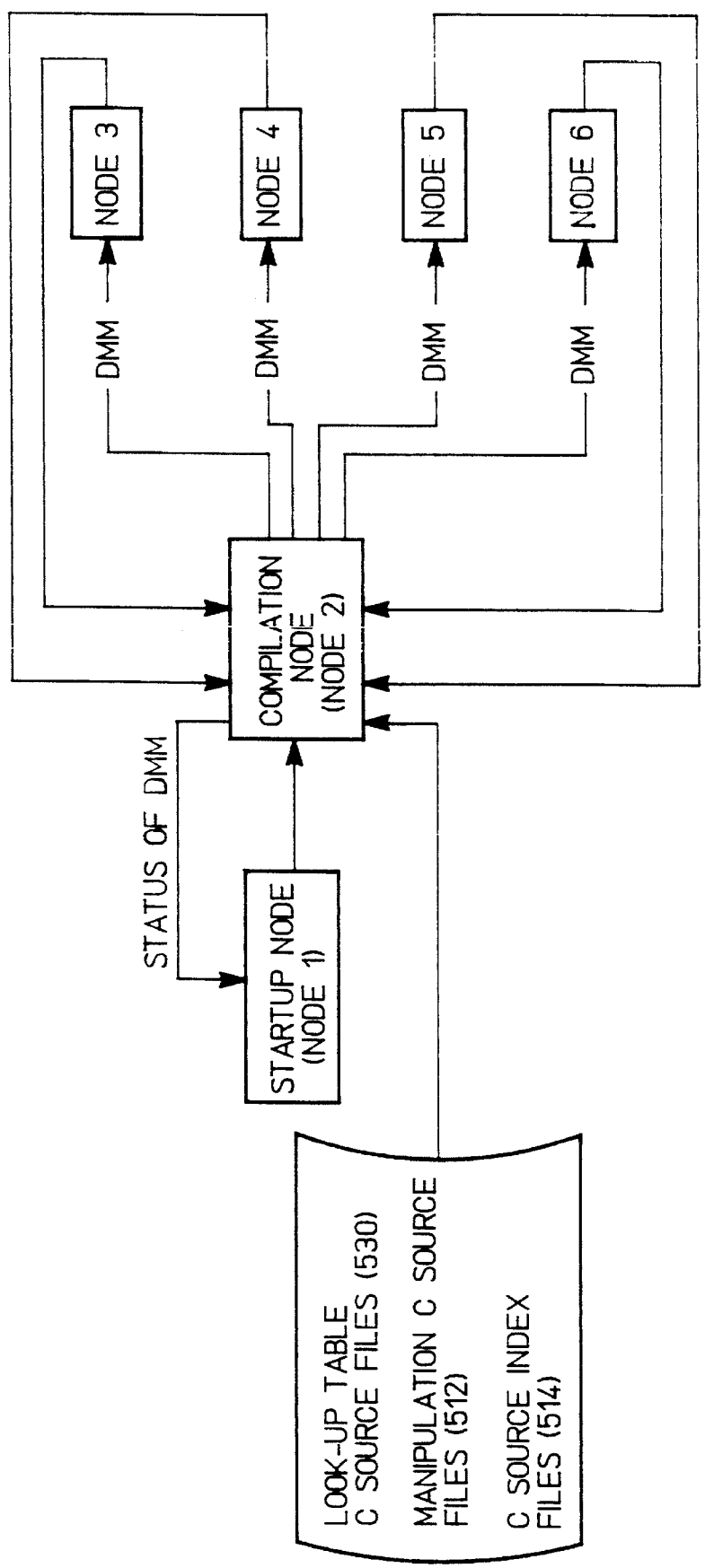
FIG. 6 schematically illustrates the distribution of the configuration information from the compilation node to each of the respective nodes of the same computer architecture as the compilation node.
Figure 7:
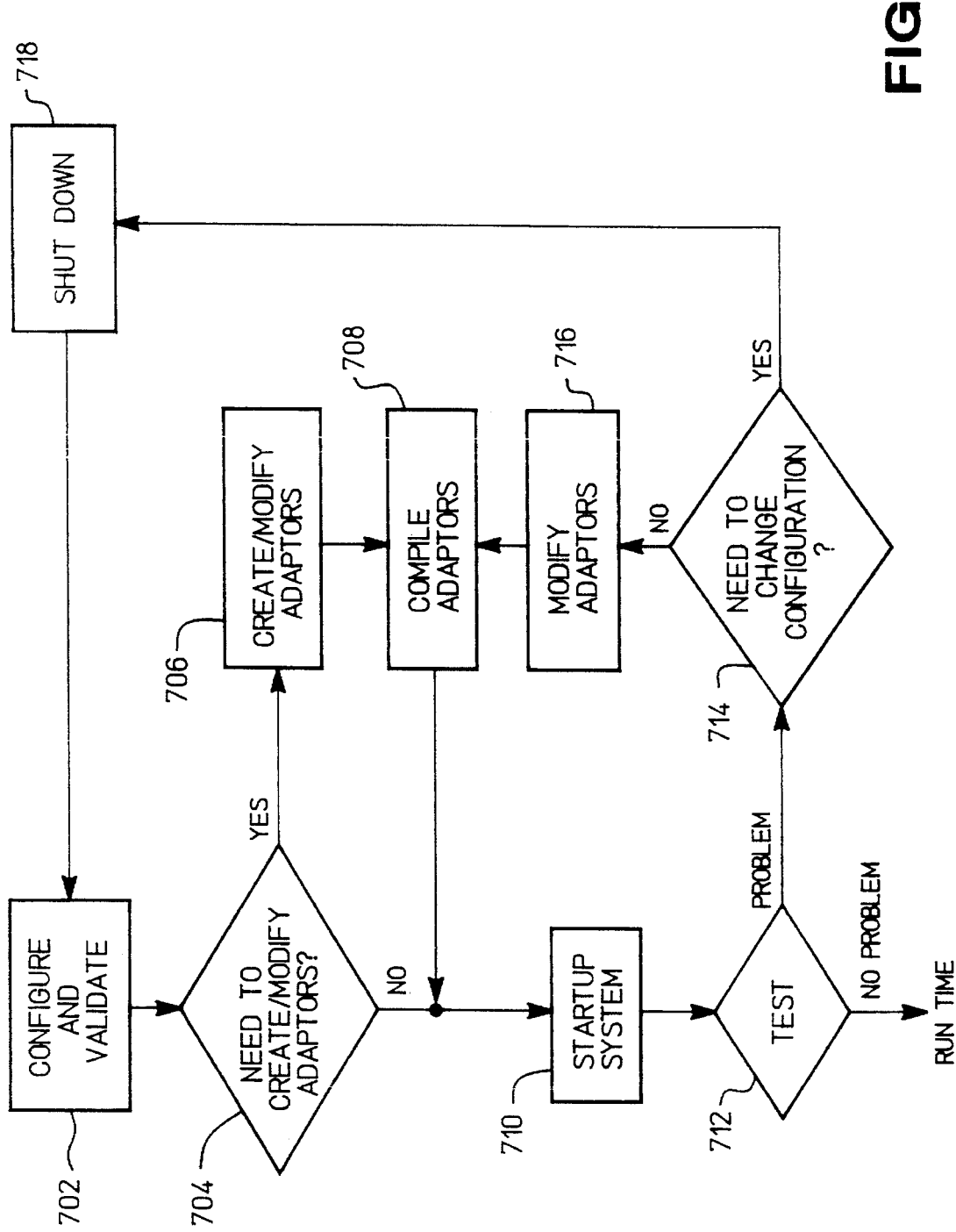
FIG. 7 is a flowchart illustrating the procedure for start-up of the integrated system which uses this invention.

FIGS. 5–7 illustrate the procedure for starting the system and setting up the DMM run time module described above with respect to FIG. 4. However, before describing these figures, the basic steps in the task of integration analysis that a system integrator or end user would follow in accordance with the system of the invention will be described. During the process, the system integrator completes a high level design of the integration system of the invention by determining the number and general functions of the processes needed to fulfill defined functional requirements. This information is required in both configuring the system and developing the application adaptors for it.

Basically, configuring the system of the invention consists of creating with any text editor a set of configuration files that describes the data to be transported and the operating environment. The configuration files provide information about the data such as the way it is structured, how to access it, how to manipulate it, and how to display it. They describe the operating environment by defining the computers in the network, their links, and the types of processes. The configuration fields are formed by the system integrator or end user in accordance with the following steps.

1. The Functional Requirements Analysis.

Functional requirements analysis means clearly defining the environment in which integration by the invention is to be performed so that the systems integrator can do a high-level design of the system to be integrated. In other words, the user determines what is to be accomplished by integration so that the requirements of such integration can be specified in a programmatic interface development phase. For example, the user may want several applications that manage part of a manufacturing system, such as tracking and scheduling work orders, to be able to communicate and exchange data. The user will need to know the resources, namely, the applications that perform particular functions or processes, the machine nodes on which those applications reside (i.e., logical node name, machine type, physical node name, and so forth), and network characteristics. Such network information is stored in a network definition (Netw) configuration file.

2. Data Flow and Application Analysis

The user must also analyze the types of data and the movement of the data between the applications that will be integrated. The user also will need to identify any synchronization needed to control the flow of data or to insure that the data remains consistent. Whether the data flows between different applications on the same system or between applications on different systems, the user also must know the specifics of the data being moved between applications. For example, the user must know the structure of messages and source applications sent and what format the destination application will accept. The user must also know the programming language used to produce the source message and what language will be used to read the messages at the destination. If manipulations are necessary to transform the message data into a format acceptable by the receiving application, the user will form a Data Definition file (Ddef) written in DDL and a Data Manipulation file (Dman) written in DML. The Ddef file defines the format of the messages passed between applications, specifically, the integers, strings, arrays, structures, records and bytes that make up the output of one application and the input for another application. The Dman file, on the other hand, contains the definitions of each data manipulation as described above. Each data manipulation defines the operations that must be performed on a source data structure so that it has the format and typing that the destination application can accept.

3. Designing The Processes

The user designs the integrated system of the invention by determining the tasks or processes required by the flow of data. The user also determines how these tasks should be grouped in application adaptors and stores this information in the Process Definition configuration file (Proc). Information in the Proc file lists the processes that send and receive data, default runstrings and miscellaneous execution information. The process logical name is used by the access routines (Appendix A) to reference a particular process definition entry.

4. Determining Data Format

The user also determines whether the data exchanged is in file or message format. If it is in file format, the user determines what file copy options to use. This information should be stored in a File Definition file (Fdef). If it is in message format, it should determine what manipulations and the like are needed.

5. Setting Links

Finally, the user defines links to associate data definitions and data manipulations with the list of nodes where the source data may be produced and the source and destination languages of the data transferred. This information is stored in a Link Definition configuration file (Link). The Link file describes the physical characteristics of data at the source and the destination of a message and binds specific data or manipulation definitions to particular links. The Link definition binds data definitions and manipulations to source locations and architecture types, source and destination languages and file definitions.

Thus, configuration in accordance with the invention means describing the applications, nodes in the network, processes, files, links and manipulations to the integration device of the invention. This is the information gathering process. In a preferred embodiment of the invention, six configuration files 502 (FIG. 5) are created by a text editor to model the system to be integrated in accordance with the invention.

Once these configuration files are created and validated, the system of the invention is ready for start-up. In particular, the run time system of the invention as shown in FIG. 4 must be established on each node of the network so that the processes on each of the nodes within the network may communicate with each other as specified in the configuration files. In other words, the DMM modules of the invention as shown in FIG. 4 must be made node-specific and installed on all the nodes in the integration domain and the configuration tables 408 loaded into memory. However, before this is done, the integrator designates an administration node, for providing functions such as start-up, shut-down and security, and preferably, a given number of alternate administration nodes are also established in case of failure of the primary administration node. The system manager 422 is then used to configure system security and to perform startup as will be described below. The user then writes and compiles the application adaptors for the various processes. However, since the application adaptors require configuration information, configuration and application adaptor development can be done in conjunction or in any order. On the other hand, since the user may use the command processor to simulate other adaptors for testing purposes, it is preferable that the user perform adaptor development as a final step. The user is now ready to start running the system of the invention to generate the DMM modules as shown in FIG. 5.

As shown in FIG. 5, the configuration files 502 are loaded onto the administration node. A validation program 504 reads in the network definitions (Netw), the process definitions (Proc), the link definitions (Link) and file definitions (Fdef) from the configuration files 502. The configuration files 502 must reside in a directory identified to validation program 504. Validation program 504 checks the integrity of the configuration files and converts them into the binary data files 510 required at start-up. The validation program then invokes the DDL compiler 506 to read the data definition (Ddef) and produce a DDL symbol table in memory. The DML compiler 508 is then invoked by the validation program 504 to read the data manipulation definitions in the Dman file and to generate C source files 512 which contain the C language instructions to perform the data manipulation and conversion of the source data to a common data representation. The DML compiler 508 then uses data definition information for the DML compiler 508, link definitions from validation process 504 and manipulation definitions from Dman 502 to generate the look-up table C source files 530, the manipulation C source files 512, and the C source index files 514. The C source index files contain the list of all C sources generated for the various nodes in the domain. A different source file index is generated for each machine type.

The validated configuration files 510, the manipulation C source files 512, and C source index files 514 and look-up table C source files 530 thus represent the configuration information in a manner that can be loaded into memory but is instead used to build the DMM 412. These files are used by the administration node during start-up process 516 to create Configuration Tables which are distributed to all nodes in the integration domain. The C source index files 514, lookup table C source files 530, and manipulation C source files 512 are used in forming node-specific data manipulation modules.

In particular, start-up is initiated on the administration node by invoking the DDLOAD program 518 to load the Configuration Tables into memory. The Configuration Tables include (1) a list of nodes in the integration domain and (2) a list of compilation nodes, where a compilation node is defined as a node on which the integration system compiles the look-up table C source files 530 and the manipulation C source files 512 for all nodes belonging to that computer architecture family in order to create the node-specific DMM. There must be at least one node defined as the compilation node for each type of computer architecture in the integration domain. In other words, a compilation node is provided for each type of computer architecture within a heterogeneous computer network environment. Of course, for a homogeneous computer network environment, only one compilation node is required.

Once the Configuration Tables are loaded on the administration node during start-up, start-up process 516 marks the nodes to be started and asks the system manager to schedule the DMM builder 520 on each compilation node. As noted above, there must be a compilation node for each machine type in the system. If the compilation node for a particular machine type is not found, an error message is issued and start-up is halted on all nodes of that machine type.

At each compilation node, the following start-up activities are conducted by DMM builder 520. The DMM builder 520 pulls (copies) the C source index file for its particular machine type along with the relevant C sources (look-up and manipulation) and the list of nodes within the network that need a new DMM onto the compilation node and compiles the C source files into object modules. The result is a DMM module 528 on the compilation node which corresponds to the DMM 412 used on that node during run time as shown in FIG. 4. The C compiler 524 compiles the manipulation C source files 522 into a customized library of object files 526 which is specific to that machine or architecture type. The Compiler 524 compiles the look-up table C source files 530 into node specific object files.

The compilation node then distributes the node-specific DMM module 528 to each node of its machine type on the network that needs it. FIG. 6 shows how the compilation node distributes the DMMs to all such nodes. As shown, the validated configuration files 510, the look-up C source files 530, the manipulation C source files 512 and the C source index files 514 are pulled by (copied) the compilation node for forming an architecture specific DMM module 528 as just described. This DMM module 528 is then distributed to all other nodes (nodes 3–6) of that architectural type on the network which need a DMM, and these nodes, in turn, notify the compilation node that they have received the DMM. The compilation node passes this status to the start-up process.

In summary, the process performs the following activities on each node, beginning with the start-up node: copies the validated files to the node; loads the Configuration Tables into memory; prepares the run time programs for start-up; starts/stops the run time programs according to the user's decision; copies a set of configuration files to all alternate administration nodes; and copies the Manipulation C source files 512, the lookup files 530 and the C source index files 514 to all alternate administration nodes.

FIG. 7 is a summary of the procedure for setting up and starting the integration system of the invention. As shown, the user first configures and validates the integration at step 702 and then determines at step 704 whether application adaptor programs need to be created or modified in order to interface the application program to the integration system. If so, the application adaptor programs are created or modified at step 706 and then compiled at step 708 for linkage into the system at start-up (step 710). The user may then test the configuration at step 712 using the command processor, and if the configuration has no problems, all nodes may be started up. On the other hand, if there is a problem with start-up, at step 714 it is determined whether the configuration needs to be changed. If not, the application adaptor programs are modified at step 716, and the modified adaptor programs are then compiled at step 708 and once again linked into the system for start-up at step 710. However, if the configuration does need to be changed after testing, control branches from step 714 to step 718 where the system is shut down to allow for reconfiguration and validation of the Configuration Tables 408. Thus, in the presently preferred embodiment, the system is shut down for reconfiguration since the configuration data is linked in during start-up of the nodes. However, as will be apparent to one of ordinary skill in the art, the configuration may be changed and validated during run time without shutting down the system, but it cannot be switched into the running system unless the current system is shut down. Once the integrated system is running, control may be turned over to the system administrator for daily administrative tasks.

DMM RUN TIME OPERATION

As described with respect to FIG. 5, the data manipulator of the invention preferably comprises a DDL compiler which processes data declarations and generates symbol tables for use by other software modules of the data manipulator. A DML compiler is also provided for processing data manipulation statements defined by the users and for generating C source code modules that will be compiled with data encoding functions (such as ASN.1 Basic Encoding Rules) in a Common Data Representation Library and with data conversion and manipulation functions in a Data Manipulation Library. The object code modules created after the compilation will be executed at run time by a module called the data manipulation shell, which determines what type of manipulations are required for a specific message and invokes appropriate manipulation modules generated by the DML compiler to transform data into a common data representation notation for transmission to a computer with a different architecture. Finally, the data manipulator of a preferred embodiment of the invention will include an "unmarshaller" module which is invoked by the Incoming Network Manager 318 to decode a message in common data representation format to the local host data and language representation.

During operation of the data manipulation module, the data manipulation shell reads a message from its in-coming mailbox (from request manager 306) and calls appropriate data manipulations (such as those in pseudocode form in Appendix E) to transform the data as requested by the user's application program (i.e., to match the destination format). After the message is manipulated, the data manipulation shell sends it to the Outgoing Network Manager 316 for delivery. At the receiving node, the Incoming Network Manager 318 gets the message from the network and determines whether an unmarshalling task (such as those in pseudocode from in Appendix F) is necessary. If it is, the incoming network manager 318 invokes the unmarshaller module. From the message content, the unmarshaller module determines which functions are needed and invokes these functions to perform the unmarshalling.

As noted above, the objective of the data manipulation module is to enable the user to transfer data between two applications residing on different machine architectures and written in different languages. The problem which arises when this is attempted is that the sending and receiving machine architecture/language may emit or expect the data to be in a particular representation or a particular data size or alignment. For example, string representations, boolean representations, row/column major addressing, data size and the like may be language specific, while byte order, two's complement notation, floating point (real) representation, character set, data size and the like may be machine-specific. Such differences in architectures and languages imply that some sort of data manipulation must be performed on data emitted to make it acceptable to a receiving application. Conversion routines are needed to support this data manipulation, and such conversion routines are included within the data manipulation module of the invention as described above with respect to FIGS. 5 and 6.

The present invention uses a Common Data Representation (CDR) in which the conversion routines needed are written to convert data back and forth from a local machine and language format to a machine- and language- independent data format. Thus, a sender of data will convert the data into CDR format and send the data. A receiving system will invoke routines to convert the CDR formatted data into the receiving system's local data format. Each machine architecture thereby only has to know about how to convert from its local machine format to CDR. Moreover, any new machine architecture added to the network only has to know the same for its data converting.

In accordance with the invention, one skilled in the art may design his or her own common data representation which will handle all the data types which are to be supported on the network. However, a presently preferred embodiment of the present invention uses an already existing, standard CDR encoding rules entitled OSI ASN.1 Basic Encoding Rules (BER). In particular, a preferred embodiment of the invention uses the byte-level "transfer syntax" format specified in ASN.1 for CDR encoding the data described by the data definition and data manipulation languages previously described.

Thus, in accordance with a preferred embodiment of the invention, the data elements transferred between machines are in ASN.1 BER encoding. The problem here is that when an ASN.1-encoded data element arrives on a target system, that data element could be unmarshalled into any one of a number of language- specific data types. Thus, a "type attribute ID" must accompany the ASN.1 encoded user data element in the message to identify the language-specific data type that the ASN.1-encoded user data element will be unmarshalled into on the target system. These type attribute IDs are also in ASN.1 encoding. A mapping is needed between DDL types and ASN.1 data types. The following is a table of presently preferred DDL data types versus ASN.1 encoded data types:

TABLE 1

| DDL Types | Type Attribute ID | ASN.1 Types | Type Attributes |
| --- | --- | --- | --- |
| bit_field | BIT_FIELD (0) | bitstring | |
| byte (8-bit) | BYTE (1) | | |
| short_int | SHORT_INT (2) | integer | |
| integer | INTEGER (3) | | |
| long_int | LONG_INT (4) | | |
| short_boolean | SHORT_BOOLEAN (5) | boolean | |
| boolean | BOOLEAN (6) | | |
| long_boolean | LONG_BOOLEAN (7) | | |
| char (8-bit) | CHAR (8) | string | |
| opaque (8-bit-aligned) | OPAQUE (9) | octet string | |
| real | REAL (10) | real | |
| long_real | LONG_REAL (11) | | |
| string (8-bit chars) | STRING (12) | string | max length |
| unsigned bit_field | U_BIT_FIELD (13) | bitstring | |
| unsigned byte (8-bit) | U_BYTE (14) | integer | |
| unsigned short_int | U_SHORT_INT (15) | | |
| unsigned integer | U_INTEGER (16) | | |
| unsigned long_int | U_LONG_INT (17) | | |
| multiple-dimen array* | ARRAY (18) | sequence-of | |
| record | RECORD (19) | sequence | restrictive type |
| packed multiple-dimen array* | PACKED_ARRAY (20) | sequence-of | |
| packed record | PACKED_RECORD (21) | sequence | restrictive type |

*The unmarshalling module assumes that the code doing the marshalling will place the elements of the multiple-dimensioned array into the row-/column-major order for the target language. In other words, the unmarshaller assumes that the elements of the ASN.1 array are in the proper row-/column-major order for the target language. It does NOT do reordering of array elements.
The parenthesized ( ) numbers after the type attribute ID name indicate the numerical value of the type attribute ID that will be used in the code.

As shown in Table 1, the type attribute ID is a name identifying the target DDL type of the ASN.1 type. The number after the name is used in the source code to represent that ID. Besides the type attribute IDs, the type attributes also include extra information that is transferred with the ASN.1 data type to allow for the correct unmarshalling by the receiving node into the target DDL type. ASN.1 data type format does not have a place for such information. For example, the ASN.1 string type data element has a field to indicate the current size of the string value, but no field to indicate what the maximum size of the string can be. This maximum size information is type attribute information. Because both the type attribute IDs and type attributes are extra information needed in addition to the actual ASN.1 encoded user data, they have both been conceptually lumped together under the title of "type attributes" herein.

"Marshalling" of data involves converting data in a local format into a machine and language independent CDR format as described above. Such marshalled data can then be sent to an "unmarshalling" module resident on this or another system in the network. The unmarshalling module will then convert that data into the local machine- and language- dependent format. In accordance with the invention, a marshalled message is broken down into two main parts: a static format message header and a dynamic format application data part. The division of these parts is based on whether the part contains predefined, static format data, or whether it contains application-bound data that can have any type of format. The message header contains administrative information needed to transfer the message, such as source/destination node means, operation flags, target process logical names and the like. It also contains the information necessary to carry out the specific functions such as send a file, start/stop a process, return status to the machine application server, and the like. The dynamic format part, on the other hand, varies depending on the application data being transferred.

The dynamic part of the message contains significant subfields. These are shown as follows:

| Static Message Part |
| --- |
| Data Buffer Header/User Data/Type Attributes |

The data buffer header contains information needed to initialize the unmarshalling process, while the user data is the ASN.1 encoded "pure" data that is expected by the receiving application. Type attributes, on the other hand, are extra, non-ASN. 1 information needed to help unmarshall the user data. For example, this type attribute data will be node specific information which allows the user data to be converted to the local data format type. Preferably, the user data is kept in one buffer and the type attribute data is contained in another data buffer during marshalling to facilitate appending (copying) of the type attribute data for a given primitive to the associated user data. The data buffer header, on the other hand, may contain information such as at what offset do the type attributes start and what is their total length. Detailed examples of the implementation of marshalling with this type of buffer format can be found in Appendix E. The user data will be marshalled into ASN.1 data elements according to the DDL-type/ASN.1-type table given previously and the ASN.1 Basic Encoding Rules (BER).

The data manipulation module marshalls the data in accordance with the invention by building a library called a Marshalling Routines Library (MRL). Each MRL will be customized for the particular machine architecture. Thus, there will be one MRL version per machine architecture type supported. In a preferred embodiment, the MRL assumes that it will be called by C language code compiled by a C compiler supported by the integration system for that particular computer architecture. Also, the MRL is not designed to be a run time shared library, and instead, the library code will be linked into the DMM's code at link time as described above.

Code emitted by the DML compiler 508 will do the following marshalling steps:
1. Start the marshalling process by marshalling the header;
2. Marshalling the source data elements in the sequential order that they will appear in the buffer at the destination program; and
3. When finished marshalling all data elements, marshalling the trailer (if present).

For ease of use, the marshalling routines preferably provide two buffers, a source buffer for holding the source localized data element, and another buffer, the target buffer, for holding the marshalled data elements.

The "unmarshalling" routines of the invention will now be described. Unmarshalling is the process by which data in the machine-independent CDR format is converted into some target machine and language format. The type of information used by the unmarshalling routines is of two types. The first type is information that can change with the use of the data such as signed/unsigned, packed/not packed, and the like. This information will be passed with the data in the CDR data stream as type attributes. The other type of information is stable information such as data alignment and byte/word sizes. This information may fit naturally into static tables.

As each CDR data element is being read, it is unmarshalled using unmarshalling routines which are built into a library called the Unmarshalling Routines Library (URL). As with the MRLs, each URL will be customized for a particular machine architecture. Thus, there will be one URL version per machine architecture type supported. Much of this customization can be handled through changes in values as the Library is built. As with the MRL, the URL is not designed to be a run time shared library. Rather, the library code will be linked into the INM's code at link time.

A selective low-level routine will be invoked to unmarshall a corresponding data element. The decision of which low-level routine to invoke will be based on what type of CDR data is in the CDR data stream. Thus, there must be a main routine built on top of these low-level routines that will look at the next data element in the CDR stream and use the type attribute ID of that element to select the low-level unmarshalling routine to invoke. Such a routine is straightforward and may be readily designed by one skilled in the art.

Language-specific information about data type sizes and alignments and pointers to the conversion routines to invoke for the DDL type at the destination node are organized into a 2×2 matrix called a Language Table. There is one Language Table per language per machine type. Preferably, the rows are DDL types, while the columns are the related localized data element size, alignment and pointer to the specific DDL unmarshalling routine to call:

TABLE 2

| DDL Type | Size | Alignment | pointer to unmarshalling routine |
|---|---|---|---|
| char | 2 | 2 | ptr |
| int | 4 | 2 | ptr |
| real | 8 | 8 | ptr |
| unsigned int | 4 | 2 | prt | cdr_to_u_int (size, alignment);

In order to determine which Language Table to choose upon receipt of data, the header of the CDR is examined for a byte of information that selects what the target language will be. This byte is used to set a global pointer to point to the Language Table to be used to unmarshall that message. To go from this byte value to a global pointer can be done with the following table of pointers to Language Tables:

TABLE 3

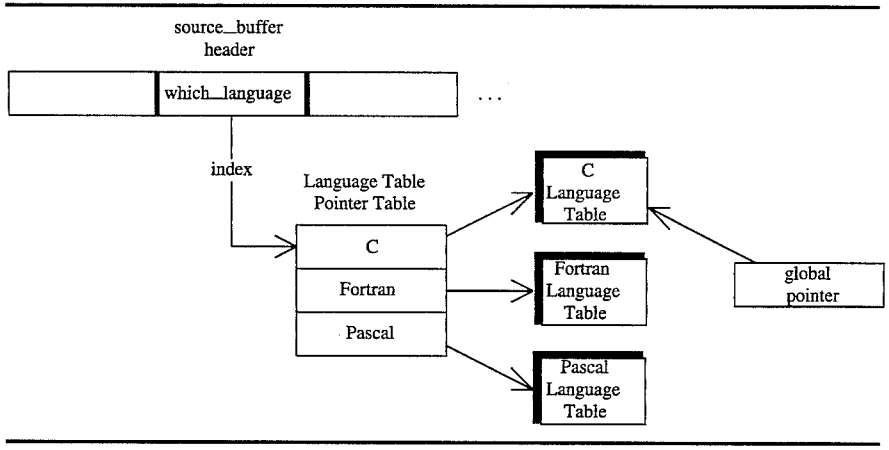

The Language Table Pointer Table (ltp_table) is set up when the unmarshalling code starts up. During the start of unmarshalling a message, the target language byte value is used as an index into ltp_table to retrieve a pointer to a Language Table. A global pointer is set to point to this Language Table, which is used by the unmarshalling code to convert the remainder of the message.

It would be easy enough to have a global pointer pointing to the selected Language Table. However, a problem arises with Pascal and packed data types. Namely, a CDR of a message arriving on a system with a target language of Pascal may have a mix of packed and unpacked data elements. Each packed versus unpacked data type requires its own size and alignment information in the Pascal Language Table. Thus, the Pascal Language Table would have to contain double the amount of information of the other Language Tables. This would also require special checking to handle packed data elements since column indices into the Pascal Language Table would have to be different to access the extra information for packed sizes/alignments for data elements. Since it is desired to minimize the amount of special handling and checking for Pascal packed types, the packed Pascal may be treated as if it resided in another Language Table. Then, by providing a semi-transparent mechanism for dynamically accessing between either the packed or unpacked versions of the Pascal Language Table, the code will be able to run much smoother and faster. The existence of the extra packed Pascal Language Table should also not affect how other languages' Language Tables are accessed. The ltp_table proposed looks like the following:

TABLE 4

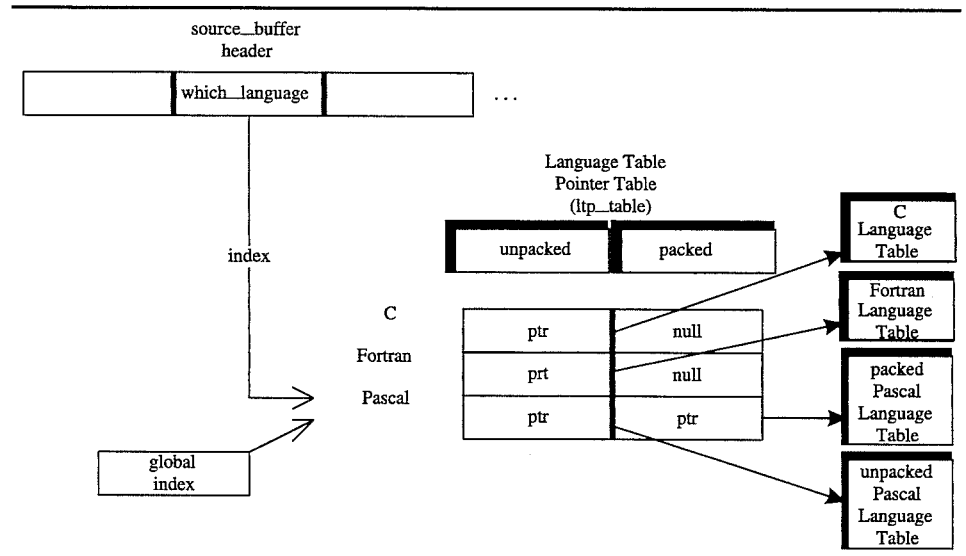

The byte out of the header of the source_buffer is used as an index into the ltp_table as shown in Table 4. This index is saved in a global variable; therefore, with this index, one knows which target language will be unmarshalled to. Also, the entry the index selects contains two pointers—one to a packed version of the Language Table, and another to an unpacked version of the Language Table. This only applies to the Pascal entry in ltp_table; the other languages have a NULL pointer for the packed pointer.

When the unmarshalling process comes across a packed array/record type attribute ID (Pascal must be the target language), this type attribute is immediately placed in a stack frame. The rest of the fields in the stack frame are initialized accordingly from information accompanying the type attribute ID. The unmarshalling process continues parsing by looking at the next data element in the input buffer.

However, the data element's size, alignment, and pointer to the conversion routine to invoke must also be determined, for although an index to the ltp_table is available, the question becomes which pointer (column) should be used in that row. This decision depends on whether the previous stack frame was packed or not. The corresponding value is used as the index into the selected row of the ltp_table. The type attribute ID is used as an index into the Language Table to pick up at a particular row the parameters and pointer to the routine to invoke.

As noted above, the user data in the transmitted message is encoded using ASN.1 BER. This is not enough for the receiving side to unmarshall this data into target language data types, for the type attributes and data headers are also marshalled although needed to help in the description. In other words, since all parts of the message follow the ASN.1 Basic Encoding Rules, the other parts must be decoded without the benefit of the data buffer header and type attributes. This is handled by expecting the data buffer header fields to be in a particular order for the data buffer header. Thus, by appropriately placing the data fields, ASN.1 unmarshalling routines may be called to unmarshall the data containing the version and target language data. However, the order of the type attributes field cannot be predicted. Accordingly, the type attributes may be unmarshalled on-the-fly during run time as needed.

Since homogenous data is not marshalled in accordance with the invention, INM 418 must have some mechanism for determining whether a received message has been converted to the CDR. Generally, this may be accomplished in accordance with the invention by providing a flag in the received data which indicates whether marshalling has been conducted at the sending side. Preferably, the following data transmission sequence is used to ensure that INM 418 will recognize whether the received data is in CDR form.

In particular, on the sending side data from the source application program gets manipulated and marshalled by DMM 412. DMM 412 sets a flag bit to indicate that the dynamic part of the message has been marshalled. DMM then sends the message to the ONM 416 on the local node. ONM 416 places a field containing the size of the total message in front of the message to be sent. The message is then sent to the destination node.

On the receiving side, INM 418 receives the incoming messages and first reads from the network the total size of a message being received. Then INM reads in the number of bytes specified by the total size to obtain the entire message. At the next step, INM 418 looks at the flag field of the message header, and if the "marshall" flag bit in the flag field is set, then the dynamic part of the message is unmarshalled into a new buffer using a special unmarshalling routine. If the "marshall" flag bit is not set, however, this step is bypassed and the received data is sent directly to the input queue of the request manager 406. In this manner, the request manger 406 will be certain to receive data having the proper formatting for the destination application.

SAMPLE CONFIGURATION

As noted above, before one can configure an integration system in accordance with the invention, one must have complete understanding of the system requirements, the system and application capabilities, and the integration functions required by the applications. Such information includes (1) the applications that will be served by the integration system, (2) the data flow (linkage requirements) between those applications, (3) the machine types running the applications, and (4) the type of networking used to tie the systems together. This information must be supplied to configure the integration system in the manner set forth above.

Figure 8:
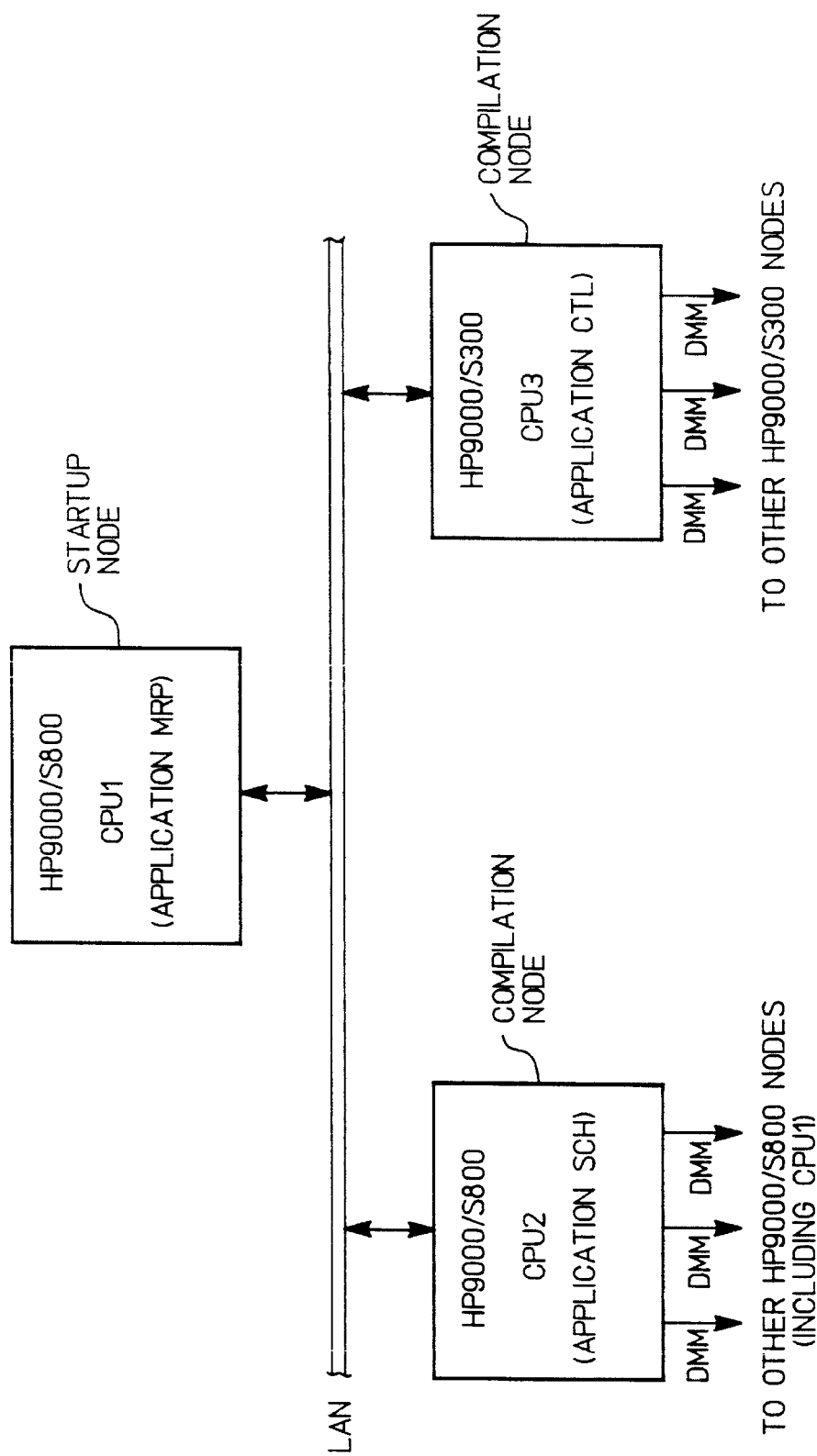
FIG. 8 schematically illustrates an example of a heterogeneous networking system in accordance with the invention.
Figure 9:
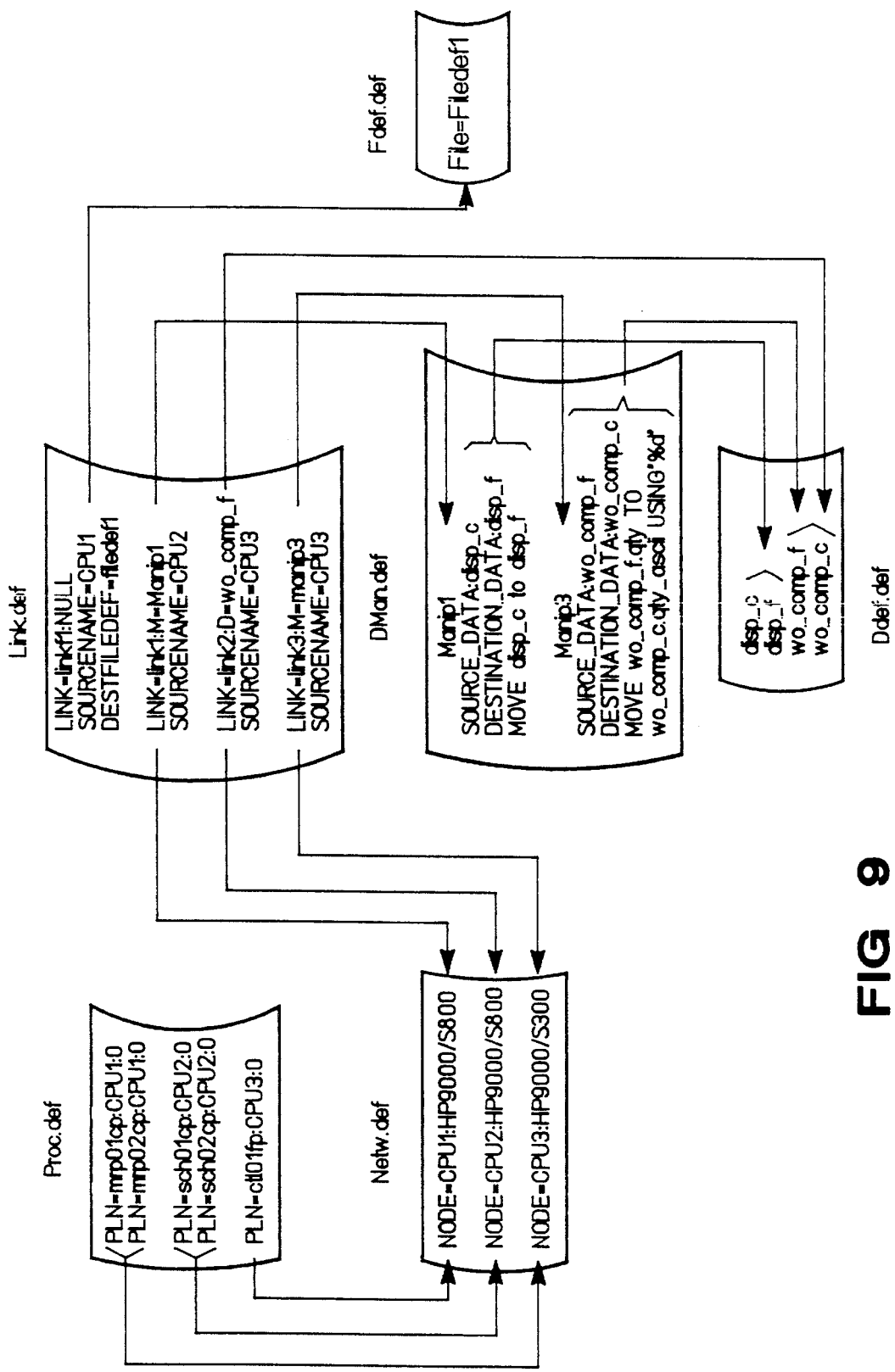
FIG. 9 illustrates sample configuration files for the sample configuration shown in FIG. 8.

The following example describes the integration tasks using one portion of a computer-integrated manufacturing system which manages work orders. The example will be described with respect to FIGS. 8 and 9, where FIG. 8 shows the system to be integrated and FIG. 9 shows the resulting configuration files. In the example, there are three applications handling work orders: a material resource planner (MRP) which generates work orders and operates on an HP9000/S800 computer (CPU1); a scheduler (SCH) which schedules the work and operates on a HP9000/S800 computer (CPU2); and a cell controller (CTL) which which manages the work and reports work completed and operates on an HP90000/S300 computer. These applications are connected over a LAN as shown in FIG. 8. For this example, it will be assumed that the MRP application generates work orders and keeps track of work completed and is written in C programming language, while the SCH application contains information about the machines, people and resources available to work on orders, creates schedules for the work, and is also written in the C programming language. The CTL application manages the work and is written in FORTRAN.

The configuration files for the system are formed as follows:

Network analysis provides information about each of the nodes which must be known before they can be used in the integrated system of the invention. This information is used in the Network Definition File (Netw) to define the nodes in the integration system. As shown in FIG. 9, the network definition file includes a file entry for each node in the integration system on which at least one application runs. In this example, the network definition file preferably describes the following items for each node: its logical name and machine type, whether or not it starts at system start-up, whether or not it is the compilation node, the maximum number of clone processes it can have, its maximum message area size, the maximum percentage of the message area any single process may use, its network type, and its physical node name. For example, application MRP runs on a node having a logical node name CPU1 and a machine type HP90000/S800, is designated to start at start-up, is not a compilation node, and is connected to a LAN type network. Netw contains similar information for the other nodes except that they are compilation nodes.

Data flow analysis of the system is then performed to determine the path that message data takes from a source application to a destination application. In particular, the user determines what each application expects as data, what each application that needs to transmit data produces as data, and how the data is represented and accessed in each application. The portions of the data that will be sent between applications is also determined. In the example, the format and type of data that is exchanged by the three applications in the work order management system are determined. It will be assumed that the applications exchange data in both files and message packets.

Because the data in the example is exchanged between applications written in different languages, the user is required to define the types of the data when the system is configured. These data descriptions are formed in the Data Definition File (Ddef) which, as noted above, enables messages to be in different formats or applications to be transformed in different languages at the source application and at the destination application to be transformed by using the data definitions in the Ddef file and the manipulations in the Dman file. On the other hand, if the data is in file format, the user can specify the options of the file transfer in a File Definition File (Fdef).

By way of example, application MRP may transfer a work order file to application SCH containing a work order number, a parts number, quantity information and due dates. The application MRP may also receive completion messages from application CTL after manufacturing is complete. Also, since the destination message layout is different from that of the source, a data manipulation must be defined with this message transfer.

Application SCH may transfer instructions in a file for scheduling work from the MRP program and dispatch a message to the CTL application containing: part number, quantity information, start date, start time, stop date, stop time and work order number. Once again, because the destination message layout is different from that of the source, a data manipulation must be defined for this message transfer. Also, completion messages from the CTL program after manufacturing is complete may be received by the application SCH. Moreover, since the source and destination applications are in different languages, a link to correct for representational differences between the languages must be identified.

The CTL application receives dispatched messages from application SCH including: the work order number, the part number, the quantity information, the start data and the start time. Work order completion messages may then be sent to the application MRP, such messages including: work order number, quantity information, part number, completion date and quality information. Also, a work order completion message containing the work order number, the quantity, the part number and completion date may be sent to application SCH.

At the data flow level, the number of processes the system data transfers require, or the specific tasks of those processes varies from one design to another. However, the information gathering procedures and mapping to configuration remain the same. For the example, the process configuration files are shown in FIG. 9 where the MRP application requires a process MRP01CP to send out the work order file and a process MRP02 CP to receive completion information. The SCH application also requires two processes: SCH01CP to receive the work order file and SCH02CP to send out a dispatch message and receive a work order completion message. The CTL application, on the other hand, requires only one process: CTL01FP to receive the dispatch message and send out completion messages. Thus, five processes are necessary to transfer the data between the three applications, and two manipulations (MANIP1 and MANIP3) are required because the layout of the data at a destination application is different from the data layout at a source application due to language and machine differences. The process information is stored in the Proc file, while the manipulation information is stored in the Dman file as shown in FIG. 9.

Since the work order management example given primarily exchanges messages, the file definition configuration file (Fdef) contains only FILEDEF1 for the case in which the MRP application sends a work order file to the SCH application. When the file reaches the SCH application, it will replace the existing target file.

The next step in the integration process requires that the language and structural details of the application data be identified. Once the data structure of both the source and destination applications have been identified, the user can decide on the manipulations required to transform the source data structure to the destination structure and data types. This data information goes into the data definition file (Ddef) and data manipulation file (Dman). Thus, the user must know the sizes of the exchanged data so that the corresponding DDL data types may be used to define the data in the Ddef file. The following Table 5 shows how data sizes in the dispatched message are used to correspond to data types between C and DDL and between FORTRAN and DDL:

TABLE 5

| Source | | | Destination | | |
|---|---|---|---|---|---|
| Language: C | | | Language: FORTRAN | | |
| Sending Buffer: Dispatch message at SCHED | | | Receiving Buffer: Dispatch message at CTL | | |
| C structure | DDL data definition Name: disp_c | | FORTRAN | DDL data definition Name: disp_f | |
| char part_no[17] | part_no | :string[17] | **See appendix C for FORTRAN definitions | part_no | :string[16] |
| int qty | qty | :integer | | wo_no | :string[10] |
| char start_date[7] | start_date | :string[7] | | qty | :integer |
| char start_time[5] | start_time | :string[5] | | start_date | :string[6] |
| char stop_date[7] | stop_date | :string[7] | | start_time | :string[4] |
| char stop_time[5] | stop_time | :string[5] | | stop_date | :string[6] |
| char wo_no[11] | wo_no | :string[11] | | stop_time | :string[4] |

The information from Table 5 may be used to determine the manipulation pattern necessary to transform the data in the integration system. These manipulations go into the data manipulation file Dman. For the present example, the manipulation statement that is required is a MOVE of the source structure (Disp_c) to the destination structure (Disp_f) (i.e., MOVE disp_c TO disp_f). This manipulation statement is contained in the example manipulation called Manip1 of FIG. 9.

The user is now ready to describe the nodes where the source data defined in the DDL or DML can originate. This information is stored in the Link Definition File (Link). The links bind the source and destination language types to a specific data definition or data manipulation at validation. At run time, the Link file designates the distribution of node-specific data manipulations to the appropriate nodes. For example, Link1 requires Manip1 to convert from source language C to destination language FORTRAN for a message originating at source node CPU2 and destined for node CPU3.

For the example given in FIGS. 8 and 9, the Link file defines the four links required for the work order management system example. Link1 binds Manip1 (the manipulation performed on the dispatch message sent from SCH to CTL) to the C language used by the SCH application. Link2 on the other hand, corrects for representational differences in the work order complete message sent from the FORTRAN application CTL to the C application SCH. The message has the same record format but is in a different language. Link2 thus points to the DDL definition of the source data structure (wo_comp_f) in the Ddef file. Link3 binds Manip3 (the manipulation performed on the work order complete message sent from CTL to MRP) to the FORTRAN language used by the CTL application. Finally, Link1 defines the link for a file transfer. The file transfered, filedef1, is the work order file that the MRP application sends to the SCH application. The NULL value indicates that no manipulations are required, only specification of destination file attributes. CPU2 and CPU3 receive the DMM modules (at startup) that enable them to handle the transfers.

FIG. 9 shows the configuration files as created for the work order management system example described above and shows how information defined in each file is referenced by the other files. This configuration file set is validated before it is used in startup in the manner described above with respect to FIG. 5. Thus, DMM 412 is created specifically to handle the manipulation specified by the user in the configuration files. For this purpose, these files are validated before startup and loaded (at startup) on each node as Configuration Tables as previously described.

Although an exemplary embodiment of the invention has been described in detail above, those skilled in the art will readily appreciate that many additional modifications are possible in the exemplary embodiment without materially departing from the novel teachings and advantages of the invention. For example, access to a remote database using the invention may be possible by eliminating the dependencies on a specific set of database management system calls. Thus, an application accessing another application's database through the remote data access routines will be freed from changes should the database structure or the database management system used by the target application change. This can be accomplished through the syntactical and structural definition of the target application database in the configuration files. In addition, the configuration files of the invention may have domains, where each domain contains a configuration for a system running on a physical network. There can thus be several domains operating concurrently on any physical network, and these domains can be managed by the user in accordance with the invention by configuring the nodes into non-overlapping domains. Also, the invention may automatically determine the optimal allocation for data manipulation in order to balance the system load. Accordingly, these and all such modifications are intended to be included within the scope of this invention as defined in the following claims.

We claim:

1. A system for integrating user software application programs operating on respective nodes of a distributed processing network having at least two of said nodes, each node of said distributed processing network comprising:

application adapting means for providing user software application programs operating on each of said nodes with communicative access to said distributed processing network;

message management means for managing data transfer requests between each user software application program operating on each of said nodes and other user software application programs operating on other of said nodes connected to said distributed processing network;

communications means responsive to a data transfer request from a source user software application program operating on any of said nodes for establishing node to node communications over said distributed processing network between a source node and a destination node, said destination node having a destination user software application program operating thereon to which data are to be transferred from said source user software application program operating on said node;

data manipulation means for manipulating, prior to transmission by said communications means to said destination user software application program operating on said destination node, message data from said source user software application program into a common data representation, said common data representation being formed in accordance with a universal encoding scheme used by all nodes of said distributed processing network to account for hardware differences between each of said nodes, computer language semantic differences between said user software application programs operating on each of said nodes, and data type formats of said data transfer requests, whereby said message data from said source user software application program are manipulated by said data manipulation means only when at least one of data types, data formats, computer languages, and physical data representations of said source and destination user software application programs do not correspond to each other;

means at each node for manipulating message data in said common data representation received from said distributed processing network into the data types, data formats, physical data representations, and computer language of each of said noes; and means for forming node-specific data manipulation means at each node of each hardware type in said distributed processing network, said node-specific data manipulation means at each node manipulating data from said source user software application program into said common data representation for transmission to said destination user software application program, and for manipulating data received from said source user software application program in said common data representation into data compatible with said destination user software application program when said destination user software application program operates on any of said nodes, said node-specific data manipulation forming means comprising:

file means for storing a high level description of user software application programs and nodes operating on said distributed processing network, the physical characteristics of data at each source and destination user software application program, and the manipulations necessary to convert data from source to destination physical characteristics;

validation module means for generating, as source code on a node designated as an adminstration node, configuration files, based on said high level description;

configuration table compiling means and data manipulation compiling means for generating, as source code on said administration node, manipulation files, based on said high level description;

data manipulation module builder means for copying said manipulation files and compiling, on each node designated as a compilation node, said manipulation files to form node-specific manipulation modules; and start up module means for copying said configuration files, for loading said configuration files in memory, and for starting up said manipulation files.

2. A system as in claim 1, wherein said common data representation is independent of the architecture of the nodes and computer programming languages used on said distributed processing network.

3. A method for integrating user software application programs operating on respective nodes of a distributed processing network having at least two of said nodes, the method at each node of said distributed processing network comprising the steps of:

providing user software application programs operating on each of said nodes with communicative access to said distributed processing network;

managing data transfer requests between each user software application program operating on each of said nodes and other user software application programs operating on another node connected to said distributed processing network;

establishing node to node communications over said distributed processing network between a source node and a destination node, said destination node having a destination user software application program operating thereon to which data are to be transferred from said source user software application program operating on at least one of said nodes;

manipulating, prior to transmission to said destination user software application program operating on said destination node, message data from said source user software application program into a common data representation, said common data representation being formed in accordance with a universal encoding scheme used by all nodes of said distributed processing network to account for hardware differences between each of said nodes, computer language semantic differences between said user software application programs operating on each of said nodes, and data type formats of said data transfer requests, whereby said message data from said source user software application program are manipulated by said data manipulation means only when at least one of data types, data formats, computer languages, and physical data representations of said source and destination user software application programs do not correspond to each other;

manipulating message data in said common data representation received from said distributed processing network into said data types, data formats, physical data representations of said destination node, and the computer language of said destination user software application program when said destination user software application program operates on said destination node; and forming node-specific data manipulation means at each node of each hardware type in said distributed processing network, said node-specific data manipulation step manipulating data from said source user software application program into said common data representation for transmission to said destination user software application program, and manipulating data received from said source user software application program in said common data representation into data compatible with said destination user software application program when said destination user software application program operates on said destination node, said node-specific data manipulation forming step further comprising the steps of:

storing a high level description of user software application programs and nodes operating on said distributed processing network, the physical characteristics of data at each source and destination user software application program, and manipulations necessary to convert data from source to destination physical characteristics;

generating, as source code on a node designated as an administration node, configuration files, based on said high level description;

generating, as source code on said administration node, manipulation files, based on said high level description;

copying said manipulation files and compiling, on each node designated as a compilation node, said manipulation files to form node-specific data manipulation modules; and copying said configuration files, for loading said configuration files in memory, and for starting up said manipulation files.

\* \* \* \* \*